(12) United States Patent
Mattsson et al.

(10) Patent No.: US 8,995,560 B2
(45) Date of Patent: Mar. 31, 2015

(54) POWER DETECTION OF INDIVIDUAL CARRIERS OF A MULTIPLE-CARRIER WIDEBAND SIGNAL

(75) Inventors: Anders S. Mattsson, San Diego, CA (US); Sean R. Rogers, San Diego, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 592 days.

(21) Appl. No.: 13/281,887

(22) Filed: Oct. 26, 2011

(65) Prior Publication Data

US 2013/0107924 A1    May 2, 2013

(51) Int. Cl.
*H04L 27/00* (2006.01)
*H04L 27/36* (2006.01)
*H04L 27/26* (2006.01)
*H04W 52/34* (2009.01)

(52) U.S. Cl.
CPC .......... *H04L 27/368* (2013.01); *H04L 27/2626* (2013.01); *H04W 52/346* (2013.01)
USPC ........... 375/295; 375/259; 455/522; 455/574; 455/127.5

(58) Field of Classification Search
CPC ..... H04W 52/00; H04W 52/34; H04W 52/04; H04W 52/146; H04W 24/00; H04W 52/02
USPC ................. 375/224, 228, 295, 377, 259–260; 455/522, 103, 59, 67.11, 574, 115.1, 455/127.1, 127.5
See application file for complete search history.

(56) References Cited

U.S. PATENT DOCUMENTS

| | | | | |
|---|---|---|---|---|
| 6,088,324 A | * | 7/2000 | Sato | 370/203 |
| 6,535,720 B1 | * | 3/2003 | Kintis et al. | 455/115.1 |
| 6,661,783 B1 | * | 12/2003 | Watanabe et al. | 370/335 |
| 7,436,912 B2 | | 10/2008 | Fudge et al. | |
| 7,817,736 B2 | * | 10/2010 | Gunturi et al. | 375/260 |

(Continued)

FOREIGN PATENT DOCUMENTS

| WO | 02/084935 A1 | 10/2002 |
|---|---|---|
| WO | 2009124936 A1 | 10/2009 |

OTHER PUBLICATIONS

PCT Search Report & Written Opinion, RE: Application #PCT/US2012/058223, Dec. 21, 2012.

*Primary Examiner* — Jean B Corrielus
(74) *Attorney, Agent, or Firm* — Faegre Baker Daniels LLP

(57) ABSTRACT

An apparatus and method measures power of channels generated by a multiple-carrier transmitter that upconverts a plurality of baseband signals to a corresponding plurality of assigned carrier frequencies to generate an RF wideband signal. A measurement module's input interface receives a selected baseband signal and a corresponding assigned carrier frequency as well as the RF wideband signal. An undersampling component undersamples the RF wideband signal for a sampling interval to generate a plurality of measured aliased samples. A determination component determines a plurality of determined aliased samples based on the selected baseband signal upconverted to the corresponding assigned carrier frequency. A correlator correlates the plurality of measured aliased samples with the plurality of determined aliased samples to produce a correlation result. A transmit power component determines a transmitted power of the correlation result for a selected channel of the RF wideband signal corresponding to the selected baseband signal as upconverted.

20 Claims, 6 Drawing Sheets

(56) References Cited

U.S. PATENT DOCUMENTS

| | | |
|---|---|---|
| 8,233,859 B2 * | 7/2012 | Yu et al. .................... 455/127.2 |
| 2002/0089923 A1 * | 7/2002 | Yoshida et al. ............... 370/208 |
| 2003/0231075 A1 | 12/2003 | Heiskala et al. |
| 2004/0105510 A1 | 6/2004 | Tomerlin et al. |
| 2004/0259509 A1 * | 12/2004 | Duello et al. .............. 455/115.1 |
| 2005/0105593 A1 * | 5/2005 | Dateki et al. ................... 375/130 |
| 2006/0008028 A1 | 1/2006 | Maltsev et al. |
| 2008/0304551 A1 * | 12/2008 | Li et al. ........................ 375/140 |
| 2010/0142596 A1 * | 6/2010 | Kang et al. .................... 375/149 |
| 2013/0128937 A1 * | 5/2013 | Somichetty et al. .......... 375/224 |

* cited by examiner

POWER DETECTION OF INDIVIDUAL CARRIERS OF A MULTIPLE-CARRIER WIDEBAND SIGNAL

BACKGROUND

1. Technical Field

The present disclosure relates to a communication system, and more particular to transmit power control of individual channels in a multiple-carrier transmission.

2. Description of the Related Art

Transmit power control is a necessary feature of communications systems to enable a receiver to reliably receive a signal that is not degraded by noise or interference, while ensuring that the signal is not transmitted at such an unnecessarily high power to cause interference. A transmitter can perform certain open-loop control techniques for transmit power control at the transmitter without the benefit of feedback from the receiver.

Increasingly, communication systems are employing multiple-carrier signals in order to carry greater amounts of information simultaneously. For example, a wireless or wired data packet communication can be performed using a plurality of channels separated in frequency in a Radio Frequency (RF) wideband signal. While averaging the overall transmit power for the RF wideband signal for closed-loop control can be readily performed, such RF wideband signals can comprise a large number of channels transmitted at a high data rate. Cable TV systems also use multi carrier systems where the individual carriers can have different power settings. This is needed due to various reasons such as different losses in the combiner systems.

BRIEF DESCRIPTION OF THE DRAWINGS

The description of the illustrative embodiments is to be read in conjunction with the accompanying drawings, wherein.

DETAILED DESCRIPTION

Figure 1:
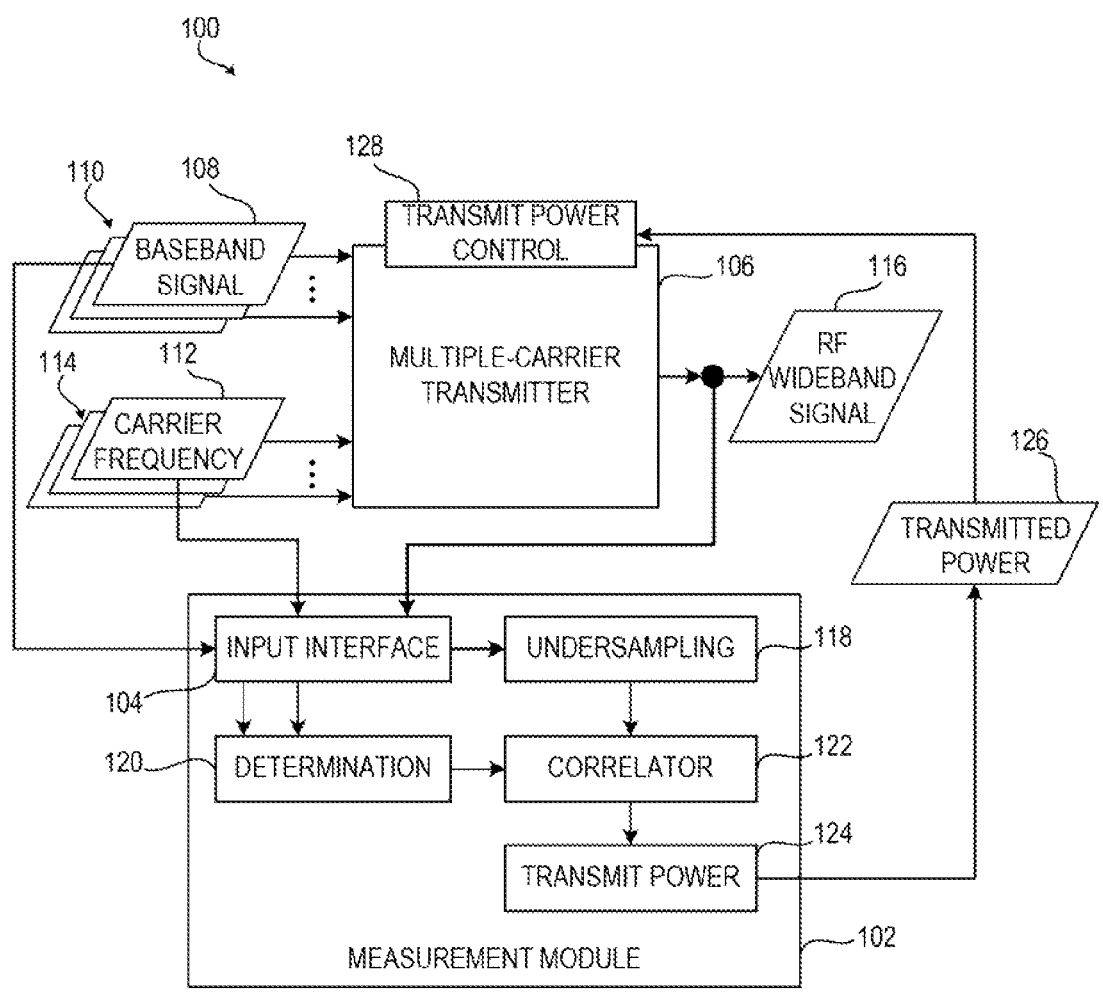
FIG. 1 provides a schematic block diagram of a channel measurement module of an example transmitter integrated circuit (IC) for a multiple-carrier transmitter, according to one embodiment.

A measurement component or measurement module of a modulator apparatus measures Radio Frequency (RF) transmit power for a multiple channel signal by receiving, from a multiple-carrier transmitter, a selected baseband signal of a plurality of baseband signals and a corresponding assigned carrier frequency of a plurality of carrier frequencies. The measurement module also receives, from the multiple-carrier transmitter, RF wideband signal comprising the plurality of baseband signals upconverted to the plurality of carrier frequencies. The measurement module undersamples the RF wideband signal for a sampling interval to generate a plurality of measured aliased samples. The measurement module determines a plurality of determined aliased samples based on the selected baseband signal upconverted to the corresponding assigned carrier frequency. The measurement module correlates the plurality of measured aliased samples with the plurality of determined aliased samples to produce a correlation result. Based on the correlation result, the measurement module determines a transmitted power for a selected channel of the RF wideband signal corresponding to the selected baseband signal upconverted to the corresponding assigned carrier frequency.

In the following detailed description of exemplary embodiments of the innovation, specific exemplary embodiments in which the innovation may be practiced are described in sufficient detail to enable those skilled in the art to practice the innovation, and it is to be understood that other embodiments may be utilized and that logical, architectural, programmatic, mechanical, electrical and other changes may be made without departing from the spirit or scope of the present innovation. The following detailed description is, therefore, not to be taken in a limiting sense, and the scope of the present innovation is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the described embodiments. The presented embodiments may thus be implemented with different nomenclature/terminology utilized to describe the components/devices/parameters herein, without limitation. Each term utilized herein is to be given its broadest interpretation given the context in which that terms is utilized.

As further described below, implementation of the functional features of the innovation is provided within processing devices/structures and involves use of a combination of hardware, firmware, as well as several software-level constructs (e.g., program code). The presented figures illustrate both hardware components and software components within the example signal processing.

With reference now to the figures, in FIG. 1 transmit signal modulator apparatus 100 comprises a measurement module 102 that measures RF transmit power for a multiple channel signal. The transmit signal modulator apparatus 100 modulates a number of baseband signals for distribution as an RF wideband signal. The transmit signal modulator apparatus 100, for another example, can be an apparatus that receives a number of television cable channels as baseband signals and that has a defined set of carrier frequencies or channels for carrying each of the television cable channels. The transmit signal modulator apparatus 100 produces an RF wideband signal that is distributed over a wired or wireless network or broadcast. Measurement module 102 comprises a plurality of components. An input interface 104 receives, from a multiple-carrier transmitter 106 of the modulator apparatus 100, a selected baseband signal 108 of a plurality of baseband signals 110 and a corresponding assigned carrier frequency 112 of a plurality of carrier frequencies 114. The input interface 104 also receives, from the multiple-carrier transmitter 106, an RF wideband signal 116 comprising the plurality of baseband signals 110 upconverted to the plurality of carrier frequencies 114. An undersampling component 118 of the measurement module 102 undersamples the RF wideband signal 116 for a sampling interval to generate a plurality of measured aliased samples. A determination component 120 of the measurement module 102 determines a plurality of determined aliased samples based on the selected baseband signal upconverted to the corresponding assigned carrier frequency. A correlator 122 of the measurement module 100 correlates the plurality of measured aliased samples with the plurality of determined aliased samples to produce a correlation result. The reference signals, which comprise baseband signals together with the known carrier frequencies, can also be undersampled. Thus, the reference signals and the RF wideband signals are both undersampled at the same sampling rate. A transmit power component 124 of the measurement module 100 determines a transmitted power 126 of the correlation result for a selected channel of the RF wideband signal corresponding to the selected baseband signal upconverted to the corresponding assigned carrier frequency. A transmit power control 128 can utilize the transmitted power 126 to perform closed-loop control of transmit power for individual channels.

Figure 2:
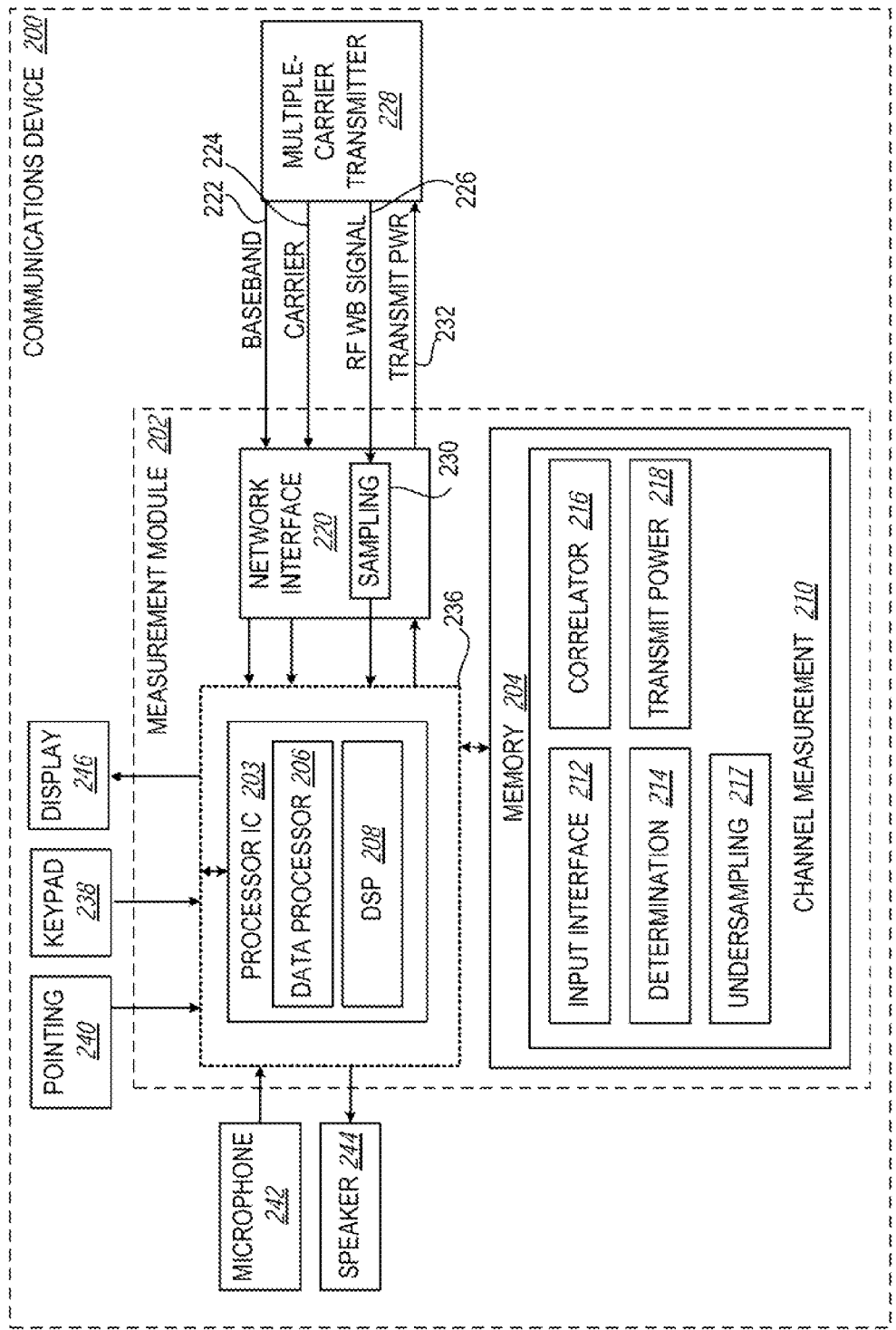
FIG. 2 provides a schematic block diagram of a communication device having a channel measurement module for a multiple-carrier transmitter according to one embodiment.

Referring now to FIG. 2, which illustrates a communications device or apparatus 200 within which the above described measurement module 100 (FIG. 1) can be implemented, according to one embodiment. As illustrated, measurement module 202 comprises processor integrated circuit (IC) 203, which is connected to memory 204. Processor IC 203 may include one or more programmable microprocessors, depicted as a data processor 206. Processor IC 203 can also include a Field Programmable Gate Array (FPGA) or digital signal processor (DSP) 208. Processor IC 203 controls the communication and other functions and/or operations of communications device 200, including the operations of measurement module 202. These functions and/or operations include, but are not limited to, data processing and signal processing to perform transmit signal power measurement via a channel measurement component 210 that is resident in memory 204.

In this embodiment, the channel measurement component 210 comprises software-implemented versions of input interface 212, determination component 214, correlator 216, undersampling component 217, and transmit power component 218 that perform the corresponding functions described by the similarly named components in FIG. 1. Alternatively, in other embodiments, portions or the entirety of the channel measurement component 210 can be implemented in firmware or other forms of dedicated circuitry. Measurement module 202 can include a network interface 220 to convert to a compatible digital form one or more baseband signals 222, one or more carrier frequencies 224 and RF wideband (WB) signal 226 from a multiple-carrier transmitter 228 (such as the multiple-carrier transmitter 106 of FIG. 1). The multiple-carrier transmitter 228 can require a sampling component 230 at the network interface 220 for a portion of the RF wideband signal 226 to reduce the amount of data received by the measurement module 202. The network interface 220 can further communicate a value for transmitted power 232 to the multiple-carrier transmitter 228.

In this example, the channel measurement module 202 may be implemented as part of the data processing functionality of communications apparatus 200. Communications apparatus 200 comprises a bus architecture or other form of inter-component connectivity that links together various circuits including one or more processors, represented generally by the processor IC 203, and computer-readable storage media, represented generally by the memory 204. The processor IC 203 is responsible for general processing, including the execution of software stored on the memory 204. The software, when executed by the processor IC 203, causes the measurement module 202 to perform various functions, as described herein.

The communication apparatus 200 can comprise input devices, of which keypad 238, pointing device 240 such as a touch screen or touch pad, and microphone 242 are illustrated, connected to processor IC 203. Additionally, communication apparatus 234 comprises output devices, such as speaker 244 and display 246, which are each connected to processor IC 203.

Figure 3:
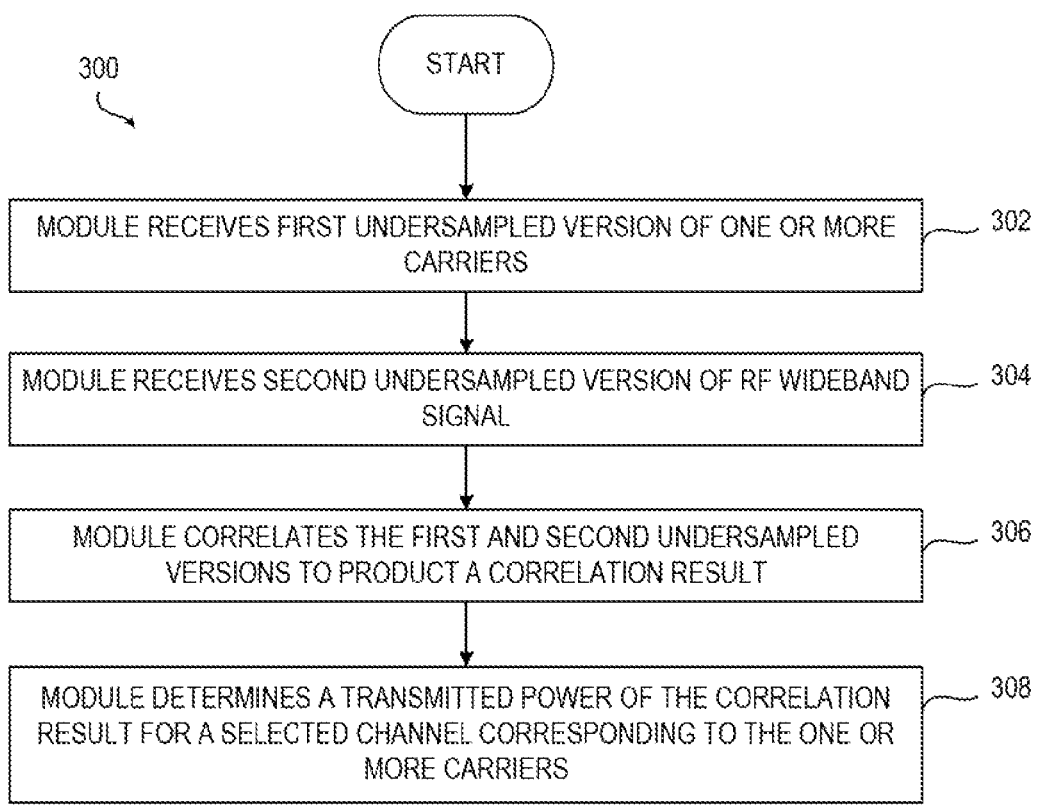
FIG. 3 provides a flow diagram of a method for measuring power of a channel of a RF wideband signal utilizing the channel measurement module, in accordance with an exemplary embodiment.

Referring to FIG. 3, in an exemplary embodiment, a methodology 300 is depicted for measuring Radio Frequency (RF) transmit power for a multiple channel signal. A module receives from a multiple-carrier transmitter, a first undersampled version of one or more carriers of a plurality of carriers (block 302). The module receives, from the multiple-carrier transmitter, a second undersampled version of an RF wideband signal comprising a plurality of baseband signals upconverted to the plurality of carriers (block 304). The module correlates the first undersampled version with the second undersampled version to produce a correlation result (block 306). The module determines a transmitted power of the correlation result for a selected channel of the RF wideband signal corresponding to the one or more carriers (block 308).

In an exemplary aspect, the module receives the first undersampled version by receiving a selected baseband signal of a plurality of baseband signals and a corresponding assigned carrier frequency of a plurality of carrier frequencies. The module determines a plurality of determined aliased samples based on the selected baseband signal upconverted to the corresponding assigned carrier frequency. The modules receives, from the multiple-carrier transmitter, the second undersampled version of the RF wideband signal by receiving, from the multiple-carrier transmitter, an RF wideband signal comprising the plurality of baseband signals upconverted to the plurality of carrier frequencies and undersampling the RF wideband signal for a sampling interval to generate a plurality of measured aliased samples. The module correlates the first undersampled version with the second undersampled version by correlating the plurality of measured aliased samples with the plurality of determined aliased samples to produce the correlation result.

Figure 4:
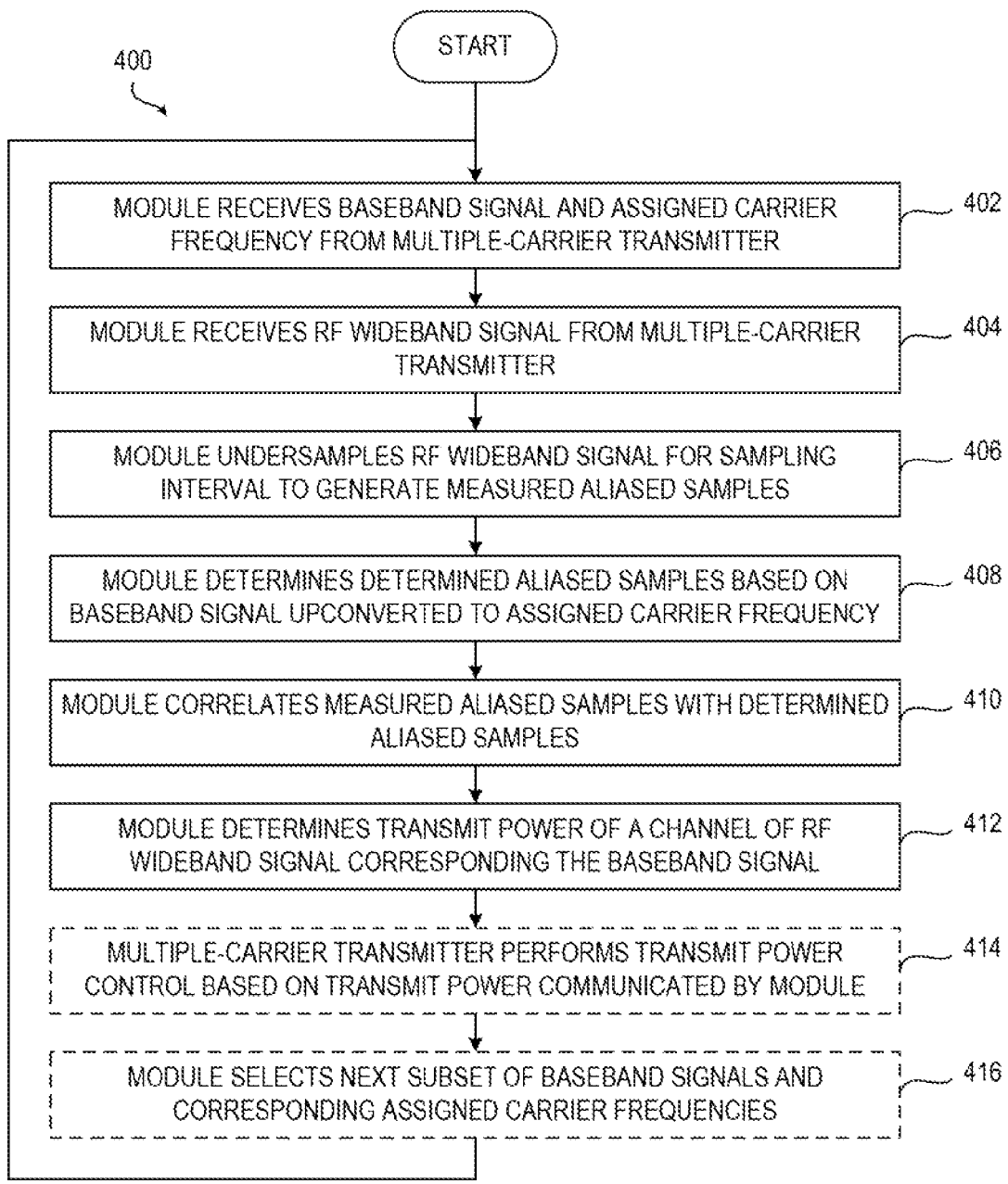
FIG. 4 provides a flow diagram of another method for measuring power of a channel of a RF wideband signal utilizing the channel measurement module, in accordance with one embodiment.

Referring now to FIG. 4, which depicts another methodology 400 for measuring transmit power for a multiple channel signal, according to an exemplary embodiment. A measurement module receives, from a multiple-carrier transmitter, a selected baseband signal of a plurality of baseband signals and also receives a corresponding assigned carrier frequency of a plurality of carrier frequencies (block 402). The measurement module also receives, from the multiple-carrier transmitter, an RF wideband signal comprising the plurality of baseband signals upconverted to the plurality of carrier frequencies to produce the RF wideband signal (block 404). In one embodiment, the RF wideband signal is in an analog form for transmission or broadcast that requires sampling by the measurement module. Alternatively, the RF wideband signal can be in a digital stream that can be undersampled by selecting aliased samples at successive intervals.

The measurement module undersamples the RF wideband signal for a sampling interval to generate a plurality of measured aliased samples (block 406). The measurement module determines a plurality of determined aliased samples based on the selected baseband signal upconverted to the corresponding assigned carrier frequency (block 408). The measurement module correlates the plurality of measured aliased samples with the plurality of determined aliased samples to produce a correlation result (block 410). The measurement module determines a transmitted power of the correlation result for a selected channel of the RF wideband signal corresponding to the selected baseband signal upconverted to the corresponding assigned carrier frequency (block 412). In one embodiment, the multiple-carrier transmitter performs transmit power control for a channel that corresponds to the selected baseband signal at the corresponding assigned carrier frequency in response to receiving the transmitted power communicated from the measurement module (block 414).

In a particular embodiment, the multiple-carrier transmitter generates a cable television signal with multiple television channels. Due to variations in calibration or gain variation over frequency in performance, the multiple-carrier transmitter can inadvertently introduce a variation in transmit power for a plurality of channels of RF wideband signal during the upconverting, amplifying and filtering of the plurality of baseband signals to generate the RF wideband signal. Transmit power control maintains each channel within a specified range of transmit power. To that end, the measurement module can, over time, measure all of the channels for transmit power.

The measurement module can receive, from the multiple-carrier transmitter, the plurality of baseband signal and the plurality of carrier frequencies. For each subset of the plurality of baseband signals, the measurement module determines a plurality of determined aliased samples based on at least one selected baseband signal upconverted to the corresponding at least one assigned carrier frequency. For each subset of the plurality of baseband signals, the measurement module also correlates the plurality of measured aliased samples with the plurality of determined aliased samples to produce a correlation result. The measurement module determines at least one transmitted power of the correlation result for at least one channel of the RF wideband signal corresponding to each subset of the plurality of baseband signals upconverted to the corresponding at least one assigned carrier frequency.

Returning to FIG. 4, the next baseband signal and/or subset of baseband signals and corresponding carrier frequency or carrier frequencies is/are selected (block 416). Then the afore-mentioned blocks 402-410 can be repeated, with the process repeated for each subset of baseband signals.

In an exemplary implementation of the present innovation, power detection is simulated of individual carriers in a cable television system spanning 1+GHz using a low sampling rate (e.g., 6-7 MHz) Analog-to-Digital Converter (ADC). In summary, undersampling an RF signal with multiple carriers results in the same carriers spectrally folding on top of each other. Aspects of the described embodiments are implemented based on a determination that if the individual carriers are independent, the individual carriers will remain independent even if undersampled. Additionally, the embodiments are also based on a determination that since a modulator apparatus that comprises a multiple-carrier transmitter knows what is transmitted at each individual carrier, the RF signal can be correlated with an undersampled version of the RF carrier. In particular, because the value of correlation is determined to be proportional to system gain, any change in power level can be readily measured by correlating the undersampled RF signal with a selected carrier. Further, using an undersampled version of the RF signal enables use of inexpensive Digital-to-Analog Converters (DACs).

Within the analysis leading to the development of the embodiments, the principal idea is that correlation between two signals does not depend on a sampling rate of two signals. For example, Let $R_{x,y}(T)$ be the true cross correlation between two variables $x_t$ and $y_t$. Let the $$R_{x,y,N,T}(\tau) = \lim_{n \to \infty} \frac{1}{N} \sum_{n=1}^{N} y(nT)\overline{x(nT+\tau)} \to R_{x,y}(\tau)$$

estimated cross correlation as a function of the number of samples N and the sampling time T be $R_{x,y,N,T}(T)$. The cross correlation does not depend on the sampling rate T. Thus, the correlation, is independent of T.

The transmitted cable television signal consists of several, e.g., up to 150, carriers and can be written as $$y_t = \text{Real}\left\{\sum_{m=1}^{M} x_m(t)\exp(i\omega_m t)\right\}$$

where $x_m(t)$ is the complex baseband signal formed by the I/Q data going through a raised cosine filter, although $x_m(t)$ can be any I/Q signal. The center frequency of the m'th carrier is $\omega_m$.

A sampled version of this signal is $$y_{t=kT} = \text{Real}\left\{\sum_{m=1}^{M} x_m(kT)\exp(i\omega_m kT)\right\} k = 0, 1, 2, 3, \ldots$$

An assumption is made that the complex baseband signals $x_n(t)$ are all uncorrelated with each other and also that the real and imaginary parts of the complex baseband signals $x_n(t)$ are uncorrelated.

One benefit appreciated by implementation of the methods of the present disclosure is that any two signals that are at different channels, i.e., signals that have no overlap in their spectra, are always uncorrelated. This is true even if the signals are modulated by the same baseband signal. Note that in this case the signals are not in the statistical sense of the word "independent". Even if the wideband signal consisted of signals that were modulated by the same baseband signal so that each carrier had exactly the same content, the two signals would still appear as uncorrelated signals in the undersampled signal as long as the two signals do not fold exactly onto each other. For instance, using a sampling frequency that is half the channel spacing should be avoided. However, even with the use of such a "bad" sampling frequency, for all practical multiple-carrier systems, for example cable television, the individual carriers are statistically independent, in which case the sampling rate does not matter.

Evaluating the cross correlation between $y_t=kT$ and a single carrier $x_p(kT)\exp(i\omega_p kT)$ results in $$R_{y,x,N,T}(\tau) = \frac{1}{N}\sum_{n=1}^{N}\text{Real}\left\{\sum_{m=1}^{M}x_m(kT)\exp(i\omega_m kT)\right\}\text{Real}\{x_p(kT+\tau)\exp(i\omega_p kT + i\omega_p \tau)\}$$

taking the means and recognizing which parts are correlated and using $x_n = I_n + i \cdot Q_n$, yields the following $$E\{R_{y,x,N,T}(\tau)\} =$$
$$\frac{1}{N}\sum_{n=1}^{N}E\left\{I_p(kT)I_p(k[T+\tau])\frac{\cos(\omega_p\tau)+\cos(2\omega_p kT-\omega_p\tau)}{2}\right\} +$$
$$\frac{1}{N}\sum_{n=1}^{N}E\left\{Q_p(kT)Q_p(k[T+\tau])\frac{\cos(\omega_p\tau)-\cos(2\omega_p kT-\omega_p\tau)}{2}\right\}.$$

It should be noted that if the sampling time T is long when using a slow sampling rate, there exists the possibility that $2\omega_p kT$ equals a multiple of $2\pi$. This will be the case if the center frequency $\omega_p$ is a multiple of the sampling rate 1/T. In the case when this term does not average to zero, then $$E\{R_{y,x,N,T}(\tau)\} = \frac{1}{N}\sum_{n=1}^{N}E\left\{I_p(kT)I_p(k[T+\tau])\frac{\cos(\omega_p\tau)}{2}\right\} +$$
$$\frac{1}{N}\sum_{n=1}^{N}E\left\{Q_p(kT)Q_p(k[T+\tau])\frac{\cos(\omega_p\tau)}{2}\right\}$$
$$= R_{x_m,x_m}(\tau)\frac{\cos(\omega_p\tau)}{2}$$

which does not depend on the actual sampling time T. In the other case $$E\{R_{x,y,N,T}(\tau)\} = \frac{1}{N}\sum_{n=1}^{N}E\left\{I_p(kT)I_p(k[T+\tau])\frac{\cos(0)+\cos(-\omega_p\tau)}{2}\right\} +$$
$$\frac{1}{N}\sum_{n=1}^{N}E\left\{Q_p(kT)Q_p(k[T+\tau])\frac{\cos(0)-\cos(-\omega_p\tau)}{2}\right\}$$
$$= R_{I_p,I_p}(\tau)$$

Assuming that the power in the real and imaginary parts of $x_m$ are the same, then $$R_{I_m,I_m}(\tau) = \frac{R_{x_m,x_m}(\tau)}{2} = R_{x_m,x_m}(\tau)\frac{\cos(\omega_m\tau)}{2}\bigg|_{\omega_m=0}$$

so that this scenario does not cause any problems as long as the power in the real and imaginary channels are the same.

A very small delay $\tau$ in the envelope will have very little effect on $Rx_m, x_m(\tau)$, as long as the delay is small compared to the inverse of the bandwidth of $x_m$. However, if the actual carrier frequency $\omega_m$ is large then $\cos(\omega_m \tau)$ might take any value between ±1. There is a risk that the estimate of the correlation is much less than that of the true correlation or that the correlation is even negative. The latter result can be a highly erroneous estimate of the power. For the effect on the delay to be small, the value of $\cos(\omega_m \tau)$ should be close to one. Since $\cos(\omega\tau) \approx 1 + (\omega\tau)^2/2$, the maximum delay one can have for a 0.1 dB error is $$\frac{(\omega\tau)^2}{2} = 0.023 \Rightarrow |\tau| < \frac{0.214}{\omega} = \frac{0.034}{f} = 0.034\lambda.$$

If the highest carrier frequency is 1 GHz, the maximum delay is 34 ps. This is equivalent to matching trace lengths to 3.4% of the wavelength, roughly. An alternate embodiment provides an alternative way of actually estimating $\cos(\omega_p \tau)$, to correlate with a phase shifted version of $x_p(kT)\exp(i\omega_p kT+i\phi)$ given the following:

$$E\{\text{Real}\{x_m(kT)\exp(i\omega_m kT+i\phi)\}\text{Real}\{x_m(kT+\tau)\exp(i\omega_n kT+i\omega_n \tau)\}\} =$$
$$E\{I_p(kT)\cos(\omega_p kT+\phi)I_m(kT)\cos(\omega_p kT+\omega_p \tau)\} +$$
$$E\{I_p(kT)\cos(\omega_p kT+\phi)I_m(kT)\cos(\omega_p kT+\omega_p \tau)\} =$$
$$R_{x,x}(\tau)\frac{\cos(\omega_p\tau-\phi)}{2}$$

It should be appreciated with the benefit of the present disclosure that one can perform the correlation with different values of $\phi$ to find the maximum of $\cos(\omega_p \tau - \phi)$. For a 0.1 dB error, $\phi$ should have resolution of 0.214 radians out of 6.14 radians for a maximum of 30 possible angles. In practice, negative values can be excluded so that more than fifteen (15) different values should not be needed. In addition, a gradient descent method could converge fairly quickly, requiring less than fifteen (15) steps and result in a higher precision. Once the optimal phase shift has been found, there should be no need to constantly search for this maximum. Since any drift can be assumed to be slow, any tracking would be straightforward and would not add any significant processing overhead. Delays that are introduced by different lengths of integrated circuit traces that propagate signals are fixed, and a delay introduced when transmitting through a wired or over-the-air link is generally static. Thus, if the difference between the trace lengths is well known and the delay in the RF chain is constant; then the delay, specifically phase shift $\omega_p \tau$, need only be characterized once.

Figures 5A, 5B:
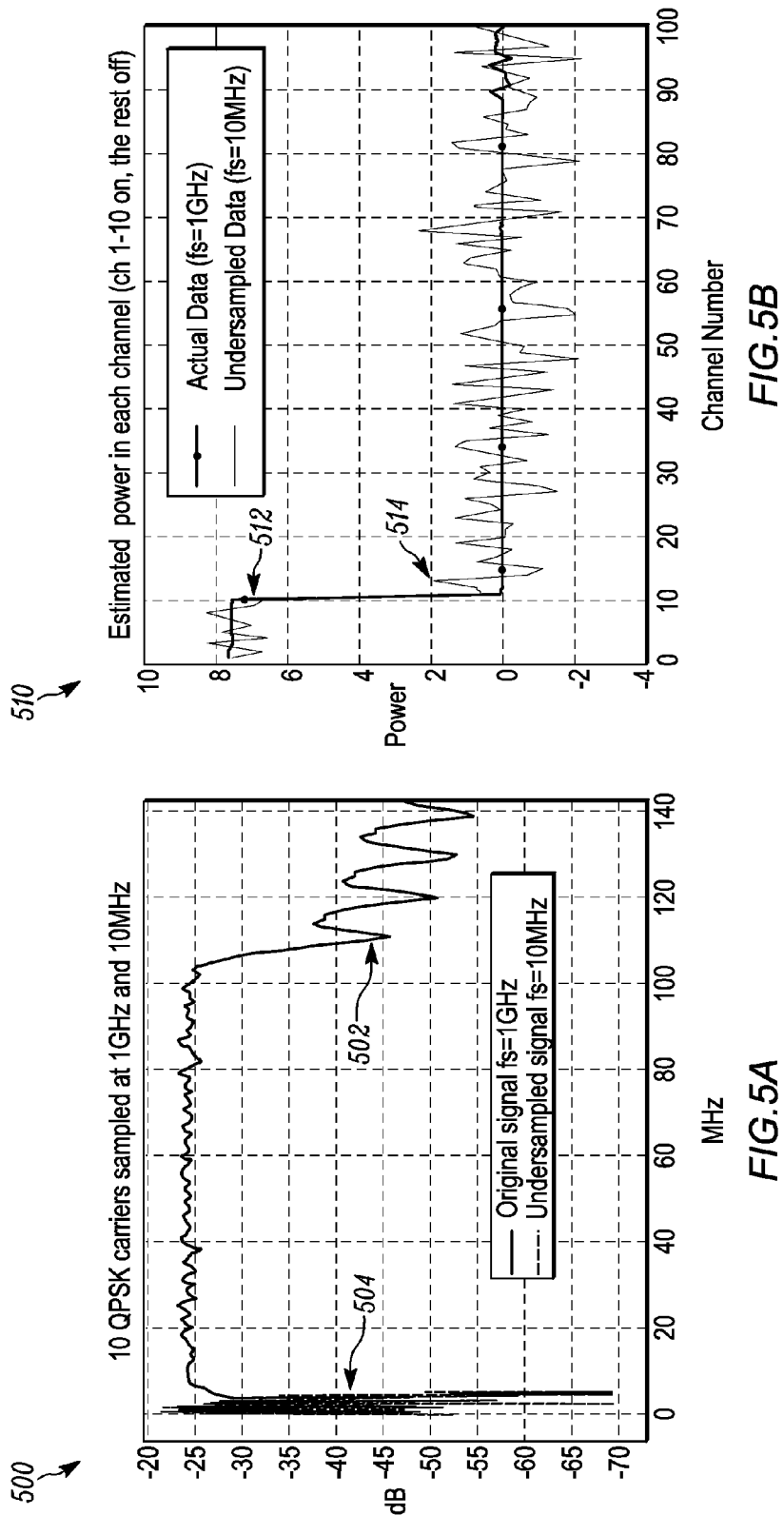
FIG. 5A provides a graphical depiction of an RF wideband signal and an undersampled version for a first simulation of the example method of FIG. 3.
FIG. 5B provides a graphical depiction of power versus channel number for a first simulation of the example method of FIG. 3.

FIGS. 5A-5B provide several graphical outputs that are generated during one or more simulations of the described embodiments. In an illustrative first simulation, a representative RF signal is generated and then down sampled. FIG. 5A is a graphical depiction 500 of the spectra of an actual RF signal 502, referred to as the "original" spectra and the undersampled or "down selected" version 504. It should be noted that the individual carriers are folded on top of each other in the undersampled signal.

After the undersampling, the various signals fold on top of each other. In this simulation, ten Quadrature Amplitude Modulation (QAM) modulated signals were put at ten different carrier frequencies. A second signal was formed by undersampling this signal by a factor of 100. Thus, FIG. 5B is a graphical depiction 510 of power per carrier measured by correlating the received signal with the different carriers with the actual data 512 (fs=1 Ghz) and undersampled data 514 (fs=10 MHz). The estimate based on the undersampled signal is noisier due to the shorter data record of 1/10th of the actual data.

The simulations show the method to work as expected. Applying observations from the testing and simulations to a practical cable television scenario, around 100 k samples are needed for a 0.2 dB precision. Less samples would be needed when fewer carrier are present. For a 6 MHz signal, a sampling time spanning around 0.02 seconds at a 6 MHz sampling rate would be required. If choosing to evaluate one channel at a time, the power of all channels can be estimate within one (1) to two (2) seconds.

A 4 GHz Digital-to-Analog (DAC) in a laboratory setting was used to generate ten (10) 6 MHz channels that constitute the spectrum. Between each channel is an empty channel. Given that the signal needs to be created for a very high data rate, the length of the modulating signal or QAM data for each channel is somewhat short. Only 2048 QAM symbols per channel were generated and then interpolated to get a sampling rate of 4 GHz. This signal was captured on an oscilloscope that acted as a high-speed DAC. The same signal was sampled at 10 MHz and 1 GHz. The spectrum of the undersampled signal was evaluated for a sampling frequency (fs) of 10, 50 and 100 MHz. Often the signals fell onto each other, while sometimes only partially overlapping. When the sampling rate was 10 MHz, all of the signals overlapped.

In one implementation, the captured data was then correlated with twenty different carriers that are the carriers used to make the signals as well as the carriers that should have been between the active channels, i.e., the carriers that should have been in the gaps in the spectrum. Correlating of the carriers with non-existing carriers was done mainly to verify that the correlation is working satisfactorily as well as to obtain an indication about the noise level or resolution that is inherent in the process.

Figure 6:
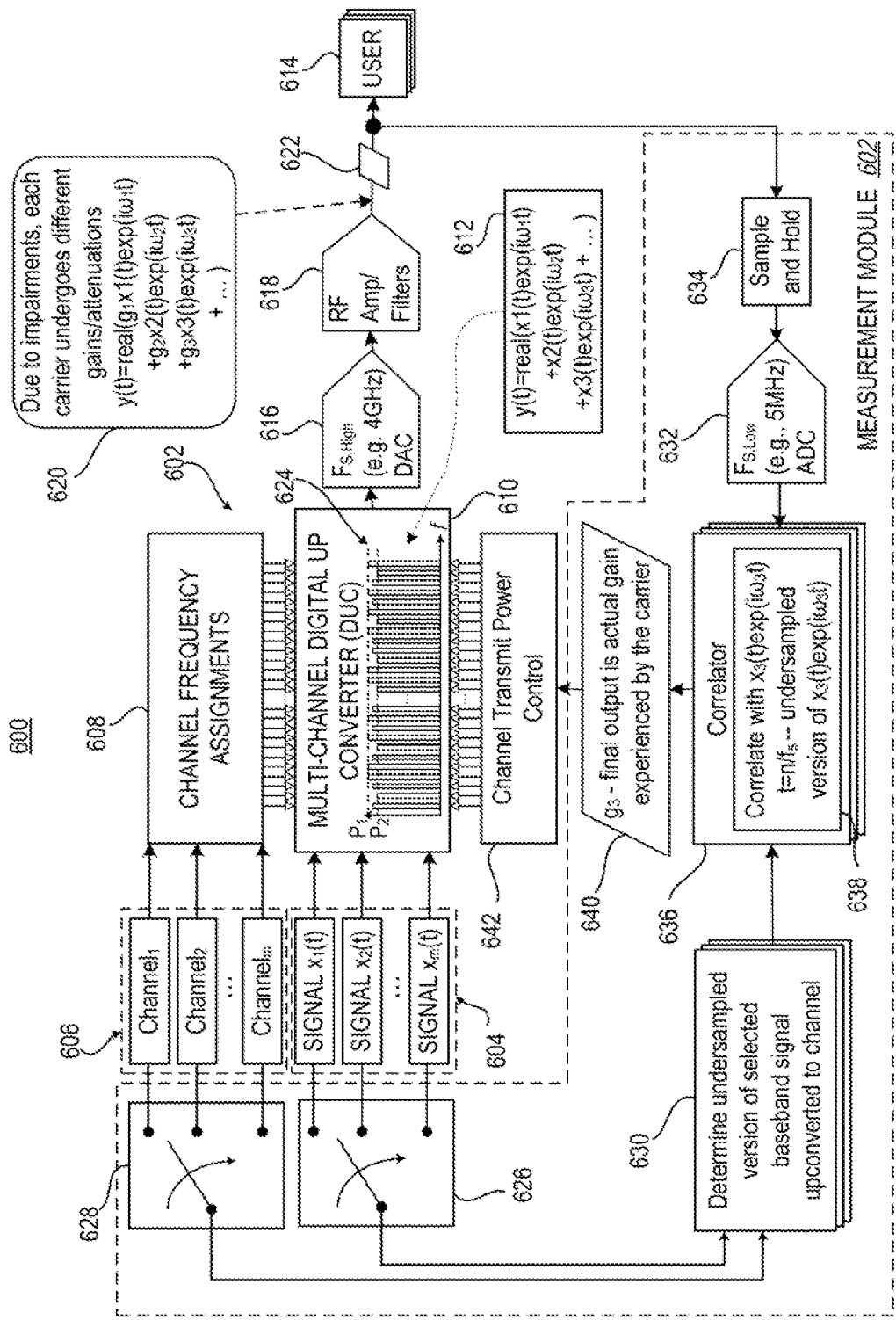
FIG. 6 provides a hybrid schematic block diagram of a modulator apparatus including processing states of a channel measurement module according to one embodiment.

FIG. 6 illustrates a functionally-descriptive version of a measurement module 602 that can be implemented in conjunction with a modulation apparatus 600. The modulation apparatus 600 receives more than one baseband signal 604 $\{x_1(t)+x_2(t)+\ldots+x_m(t)\}$. More than one carrier frequencies 606 are assigned by a channel frequency assignment component 608 to each of the baseband signals 604. A multiple-channel digital upconverter (DUC) 610 upconverts the baseband signals 604 to the corresponding assigned carrier frequency 606, forming a multiple-carrier, RF wideband signal 612 comprised of a number of channels $\{y(t)=\text{real}(x_1(t)\exp(i\omega 1t)+x_2(t)\exp(i\omega 2t)+x_3(t)\exp(i\omega 3t)+\ldots)\}$. In an exemplary aspect, this unamplified RF wideband signal requires amplification for transmission to users 614, which amplification is depicted as being completed via Digital-to-Analog Converter (DAC) 616 in series with RF amplifiers and filters circuitry 618. As depicted at 620, the resulting RF wideband signal 622 $\{y(t)=\text{real}(g1 \times 1(t)\exp(i\omega 1t)+g2 \times 2(t)\exp(i\omega 2t)+g3 \times 3(t)\exp(i\omega 3t)+\ldots)\}$ can have impairments since each carrier or channel undergoes different gains/attenuations. In an exemplary aspect, multi-channel digital up converter (DUC) 624 provides a power level for each carrier or channel. The power level is maintained between an upper power threshold $P_1$ and a lower power threshold $P_2$.

The measurement module 602 receives one or more baseband signals 604 at multi-channel DUC 624 and the corresponding assigned one or more carrier frequencies 606 within channel frequency assignments 608. Each of the baseband signals 604 can be selected over time as represented by a first switch 626. Each of the carrier frequencies 606 can be selected over time as represented by a second switch 628. The measurement module 602 determines an undersampled version of the selected baseband signal 604 (e.g., the third baseband signal $x_3(t)$) upconverted to the corresponding assigned carrier frequency (channel) 606 (e.g., $x_3(t)\exp(i\omega_3 t)$ at $t=n/fs$), resulting in determined aliased samples (block 630).

The measurement module 602 can include a low-speed ADC 632 that is used to sample the wideband RF signal 620 from the multiple-carrier transmitter 602. Note that the ADC 632 requires a front end sample and hold circuitry 634 with sufficient bandwidth for undersampling the signal. A correlator 636 correlates the determined aliased sampled with the measured aliased samples, as shown at block 638. A value for power "$g_3$," measured for the third baseband signal results from the correlation, as depicted at block 640. The measurement module 602 communicates this value to a channel transmit power control 642 of the multiple-carrier transmitter 600.

It should be appreciated with the present disclosure that, especially when sampling over longer time periods, a signal that is correlated will appear uncorrelated if the clock used for generating the signal, i.e., the DAC clock is different from the ADC clock. The ADC clock, for instance, could be locked to the DAC clock. Also, when sampling rate is low compared to the data rate, e.g., sampling 6 MHz signals at 10 MHz, time offsets that are a fraction of a sample can have a significant impact on the correlation, resulting in roughly about 3 dB-6 dB errors. This fractional delay can be easily estimated and digitally compensated for without any substantial increase in the computational load. Once the delay has been found, the embodiments include verification that the delay is infrequently changed.

By virtue of the foregoing, an apparatus and method of the present disclosure provide substantially precise measurement and control of individual carrier levels in a multiple-carrier signal, such as multicarrier cable television signal. The disclosed closed-loop control avoids cumbersome or exacting factory calibrations required with conventional open-loop methods of controlling carrier power. Power detection of an individual carrier in a multicarrier uplink signal is calculated by correlating an undersampled multiple-carrier baseband signal and a baseband signal for the individual carrier. In one embodiment, calculating the correlation is performed by sampling the multicarrier signal at a rate below the bandwidth of the multiple-carrier signal, multiplying baseband signal samples of the individual carrier with the multicarrier signal samples, and averaging the multiplied baseband and multicarrier signal samples. In another embodiment, carrier power levels are controlled in a multicarrier uplink signal by calculating the correlation of the undersampled multicarrier signal and a baseband signal for an individual carrier, comparing the correlation with a predetermined level to generate an error signal, and adjusting the individual carrier level to minimize the error signal.

In the flow charts of FIGS. 3 and 4 described above, one or more of the method processes may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the innovation. Thus, while the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

As will be appreciated by one skilled in the art, aspects of the present innovation may be embodied as a system, method or computer program product. Accordingly, aspects of the present innovation may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present innovation may take the form of a computer program product embodied in one or more computer readable medium(s) having computer readable program code embodied thereon.

Computer program code for carrying out operations for aspects of the present innovation may be written in any combination of one or more programming languages, including an object oriented programming language such as Java, Smalltalk, C++ or the like and conventional procedural programming languages, such as the "C" programming language or assembly level programming or similar programming languages.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A method of measuring Radio Frequency (RF) transmit power for a multiple channel signal, the method comprising:
receiving, from a multiple-carrier transmitter, a first undersampled version of one or more carriers of a plurality of carriers;
receiving, from the multiple-carrier transmitter, a second undersampled version of an RF wideband signal comprising a plurality of baseband signals upconverted to the plurality of carriers;
correlating the first undersampled version with the second undersampled version to produce a correlation result; and
determining a transmitted power of the correlation result for a selected channel of the RF wideband signal corresponding to the one or more carriers.

2. The method of claim 1, wherein:
receiving the first undersampled version further comprises receiving a selected baseband signal of a plurality of baseband signals and a corresponding assigned carrier frequency of a plurality of carrier frequencies, and determining a plurality of determined aliased samples based on the selected baseband signal upconverted to the corresponding assigned carrier frequency;
receiving, from the multiple-carrier transmitter, the second undersampled version of the RF wideband signal further comprises receiving, from the multiple-carrier transmitter, the RF wideband signal and undersampling the RF wideband signal for a sampling interval to generate a plurality of measured aliased samples; and
correlating the first undersampled version with the second undersampled version further comprises correlating the plurality of measured aliased samples with the plurality of determined aliased samples to produce the correlation result.

3. The method of claim 2, further comprising:
receiving, from the multiple-carrier transmitter, the plurality of baseband signal and the plurality of carrier frequencies;
for each subset of the plurality of baseband signals, determining a plurality of determined aliased samples based on at least one selected baseband signal upconverted to the corresponding at least one assigned carrier frequency;

for each subset of the plurality of baseband signals, correlating the plurality of measured aliased samples with the plurality of determined aliased samples to produce a correlation result; and determining at least one transmitted power of the correlation result for at least one channel of the RF wideband signal corresponding to each subset of the plurality of baseband signals upconverted to the corresponding at least one assigned carrier frequency.

4. The method of claim 1, wherein receiving the second undersampled version of the RF wideband signal further comprises receiving a digital stream, and the method further comprises undersampling the digital stream by deleting selected samples to generate the second undersampled version.

5. The method of claim 1, wherein receiving the second undersampled version of the RF wideband signal further comprises digitally undersampling an analog RF wideband signal.

6. The method of claim 1, further comprising communicating the transmitted power to the multiple-carrier transmitter to control transmit power for the selected channel of the RF wideband signal.

7. The method of claim 1, wherein receiving, from the multiple-carrier transmitter, the first undersampled version of the one or more carriers of the plurality of carriers further comprises receiving a corresponding one or more baseband signals that are undersampled.

8. The method of claim 1, wherein the multiple-carrier transmitter introduces a variation in transmit power for a plurality of channels during upconverting, amplifying, and filtering of the plurality of baseband signals to generate the RF wideband signal, the method further comprising communicating the transmit power to the multiple-carrier transmitter.

9. A measurement module of measuring Radio Frequency (RF) transmit power for a multiple channel signal, the measurement module comprising:

an input interface that receives, from a multiple-carrier transmitter, a first undersampled version of one or more carriers of a plurality of carriers, and which receives, from the multiple-carrier transmitter, a second undersampled version of an RF wideband signal comprising a plurality of baseband signals upconverted to the plurality of carriers;

a correlator that correlates the first undersampled version with the second undersampled version to produce a correlation result; and a transmit power component that determines a transmitted power of the correlation result for a selected channel of the RF wideband signal corresponding to the one or more carriers.

10. The measurement module of claim 9, wherein:

the input interface further receives the first undersampled version by receiving a selected baseband signal of a plurality of baseband signals and a corresponding assigned carrier frequency of a plurality of carrier frequencies;

the measurement module further comprising a determination component that determines a plurality of determined aliased samples based on the selected baseband signal upconverted to the corresponding assigned carrier frequency;

the input interface further receives, from the multiple-carrier transmitter, the second undersampled version of the RF wideband signal by receiving, from the multiple-carrier transmitter, the RF wideband signal, the measurement module further comprising an undersampling component to undersample the RF wideband signal for a sampling interval to generate a plurality of measured aliased samples; and the correlator correlates the first undersampled version with the second undersampled version by correlating the plurality of measured aliased samples with the plurality of determined aliased samples to produce the correlation result.

11. The measurement module of claim 10, wherein:

the input interface further receives, from the multiple-carrier transmitter, the plurality of baseband signal and the plurality of carrier frequencies;

for each subset of the plurality of baseband signals, the determination component determines a plurality of determined aliased samples based on at least one selected baseband signal upconverted to the corresponding at least one assigned carrier frequency;

for each subset of the plurality of baseband signals, the correlator correlates the plurality of measured aliased samples with the plurality of determined aliased samples to produce a correlation result; and the determination component determines at least one transmitted power of the correlation result for at least one channel of the RF wideband signal corresponding to each subset of the plurality of baseband signals upconverted to the corresponding at least one assigned carrier frequency.

12. The measurement module of claim 9, wherein the input interface further receives the second undersampled version of the RF wideband signal by receiving a digital stream, and the measurement module further comprises an undersampling component to undersample the digital stream by deleting selected samples to generate the second undersampled version.

13. The measurement module of claim 9, wherein the input interface further receives an analog RF wideband signal, the measurement module further comprising an undersampling component to undersample the analog RF wideband signal to produce the second undersampled version of the RF wideband signal.

14. The measurement module of claim 9, wherein the transmit power component communicates the transmitted power to the multiple-carrier transmitter to control transmit power for the selected channel of the RF wideband signal.

15. The measurement module of claim 9, wherein the input interface further receives, from the multiple-carrier transmitter, the first undersampled version of the one or more carriers of the plurality of carriers by receiving a corresponding one or more baseband signals that are undersampled.

16. The measurement module of claim 9, wherein the multiple-carrier transmitter introduces a variation in transmit power for a plurality of channels during upconverting, amplifying, and filtering of the plurality of baseband signals to generate the RF wideband signal, and wherein the transmit power component communicates the transmit power to the multiple-carrier transmitter.

17. An apparatus of generating a Radio Frequency (RF), multiple channel signal, the apparatus comprising:

a multiple-carrier transmitter to upconvert a plurality of baseband signals to a corresponding plurality of assigned carrier frequencies to generate an RF wideband signal; and a measurement module comprising:

an input interface to receive, from the multiple-carrier transmitter, a first undersampled version of one or more carriers of a plurality of carriers, and to receive, from the multiple-carrier transmitter, a second undersampled version of the RF wideband signal;
a correlator that correlates the first undersampled version with the second undersampled version to produce a correlation result; and
a transmit power component that determines a transmitted power of the correlation result for a selected channel of the RF wideband signal corresponding to the one or more carriers.

18. The apparatus of claim 17, wherein:
the input interface further receives the first undersampled version by receiving a selected baseband signal of a plurality of baseband signals and a corresponding assigned carrier frequency of a plurality of carrier frequencies;
the measurement module further comprises a determination component that determines a plurality of determined aliased samples based on the selected baseband signal upconverted to the corresponding assigned carrier frequency;
the input interface further receives, from the multiple-carrier transmitter, the second undersampled version of the RF wideband signal by receiving, from the multiple-carrier transmitter, the RF wideband signal, the measurement module further comprising an undersampling component to undersample the RF wideband signal for a sampling interval to generate a plurality of measured aliased samples; and
the correlator further correlates the first undersampled version with the second undersampled version by correlating the plurality of measured aliased samples with the plurality of determined aliased samples to produce the correlation result.

19. The apparatus of claim 18, wherein:
the input interface further receives, from the multiple-carrier transmitter, the plurality of baseband signal and the plurality of carrier frequencies;
for each subset of the plurality of baseband signals, the determination component determines a plurality of determined aliased samples based on at least one selected baseband signal upconverted to the corresponding at least one assigned carrier frequency;
for each subset of the plurality of baseband signals, the correlator correlates the plurality of measured aliased samples with the plurality of determined aliased samples to produce a correlation result; and
the determination component further determines at least one transmitted power of the correlation result for at least one channel of the RF wideband signal corresponding to each subset of the plurality of baseband signals upconverted to the corresponding at least one assigned carrier frequency.

20. The apparatus of claim 17, wherein the input interface further receives the second undersampled version of the RF wideband signal by receiving a digital stream, and the measurement module further comprises an undersampling component to undersample the digital stream by deleting selected samples to generate the second undersampled version.

* * * * *